R. OCHSNER.
AUTOMOBILE LOCK.
APPLICATION FILED NOV. 18, 1919.
1,331,166.
Patented Feb. 17, 1920.
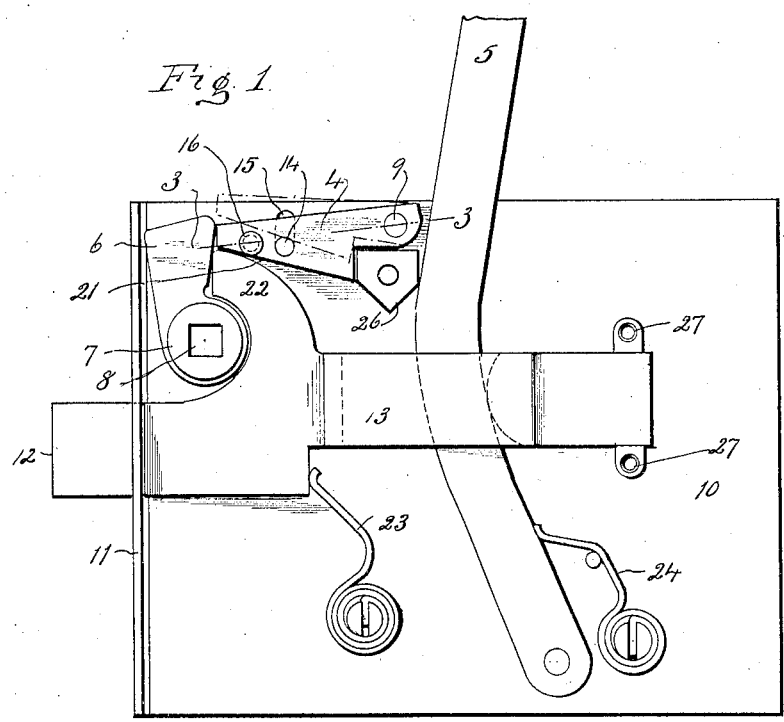
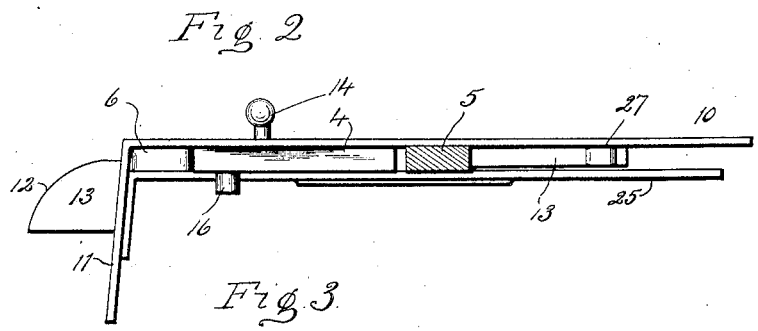
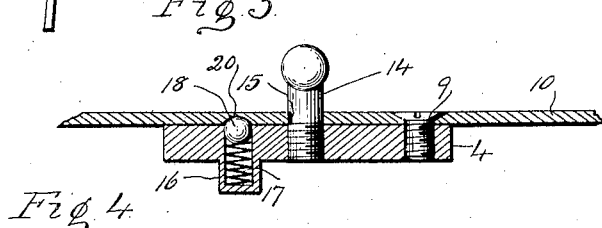
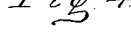

UNITED STATES PATENT OFFICE.

ROBERT OCHSNER, OF NEW HAVEN, CONNECTICUT.

AUTOMOBILE-LOCK.

1,331,166.  Specification of Letters Patent.  Patented Feb. 17, 1920.

Application filed November 18, 1919. Serial No. 338,917.

*To all whom it may concern:*

Be it known that I, ROBERT OCHSNER, a citizen of the United States, residing at New Haven, in the county of New Haven and State of Connecticut, have invented a new and useful Improvement in Automobile-Locks; and I do hereby declare the following, when taken in connection with the accompanying drawings and the characters of reference marked thereon, to be a full, clear, and exact description of the same, and which said drawings constitute part of this application, and represent, in—

Figure 1, a view in inside elevation of an automobile lock constructed in accordance with my invention, the inner case-plate being removed.

Fig. 2, a plan view of the lock with the lever-handle in transverse section.

Fig. 3, an enlarged broken view in horizontal section on the line 3—3 of Fig. 1.

Fig. 4, a broken view in inside elevation of the outer case-plate showing the recesses formed therein for the reception of the ball of the spring of the locking-dog.

My invention relates to an improved automobile lock of the latch-bolt type, the object being to provide a simple and convenient device of the character described, whereby the door mounting the lock may be locked from the inside of the car so that it cannot be opened from the outside of the car and whereby it becomes unnecessary to provide but one door of a car with a key-lock.

With these ends in view my invention consists in an automobile lock provided with a locking-dog interposed between its means on the inside of the door for retracting the latch-bolt and its means for retracting the lotch-bolt from the outside of the door, the said dog being manually moved into its locked position and released therefrom by the operation of the means on the inside of the door for retracting the latch-bolt. My invention further consists in certain details of construction as will be hereinafter described and pointed out in the claims.

In carrying out my invention as herein shown, I employ a locking-dog 4 arranged horizontally between the forward edge of the lever-handle 5 and the upper end of the roll-back cam 6 upstanding from the roll-back or hub 7 which has a square opening 8 for the reception of the shank of the outside door-handle which is not shown but which may be of any standard construction. The said dog 4 is mounted upon a screw 9 turning in the outer case-plate 10 of the lock, the said plate being formed as usual with a face-plate 11 through which the beveled end 12 of the latch-bolt 13 passes and the said bolt being engaged for its retraction from the inside of the door by the lever-handle 5. The dog is provided with an inwardly projecting finger-button 14 passing through an elongated slot 15 in the case-plate, the upper end of the slot limiting the upward movement of the dog. For holding the dog in its locking and its retired positions and so preventing it from rattling, it is provided, as shown, with an inwardly projecting hollow boss 16 receiving a helical spring 17 acting upon a ball 18 entering one or the other of two shallow recesses 19 or 20 located approximately one above the other in the inner face of the case-plate, these recesses being spaced apart to correspond to the elevated and depressed positions of the dog which is thus held in one or the other of its positions. The lower face of the dog 4 is beveled as at 21 and rests upon the upstanding outwardly curved retracting-arm 22 of the latch-bolt 13 which is provided with a spring 23 arranged to exert a constant effort to throw the bolt into its locked position. The lever-handle 5 is also provided with a spring 24 exerting pressure in the same direction. The parts described are inclosed between the outer case-plate 11 aforesaid and an inner case-plate 25 screwed to spacing lugs 26 and 27, the latter serving also to guide the bolt 13.

A car having its doors equipped with my improved automobile latch-bolt lock, has no need to have but one of its doors provided with a separate key-lock since on leaving the car, the door or doors provided with my improved lock are then locked against being opened from the outside of the car by simply pressing down upon the finger-buttons 14 of the latch-bolt locks, whereby the locking-dogs 4 are thrown down into their locking position in which they prevent the turning of the door-handles from the outside of the car and hence the retraction of the latch-bolts of the locks. Thus, if an attempt is made to turn any handle-knob, the upstanding roll-back cam 6 of its lock will at once engage with the end of the locking dog 4 of the lock and be prevented from acting upon the arm 21 of the bolt 13 of the lock. The doors are thus as effectually locked from the outside as though protected by independent key-locks. However, on reëntering the car through a door provided with a key-lock, the pulling back of the lever-handle 5 of any lock immediately causes its upstanding arm 21 to engage with the beveled lower edge of the locking-dog, whereby the same is lifted into its elevated position as shown by broken lines in Fig. 1, in which position it is cleared from engagement with the roll-back cam 6 of the roll-back 8. In this position of the locking-dog 4, which is its normal position, the lock is used as though the locking-dog was not present.

I claim:

1. In a latch-bolt lock for automobiles, the combination with a latch-bolt, of a lever-handle therefor, means on the inside of the door for the retraction of the latch-bolt, means for the retraction of the bolt from the outside of the door, and a locking-dog interposed between the said means and manually moved into its operating position, and automatically moved into its retired position by the operation of the said bolt-retracting means.

2. In a latch-bolt lock for automobiles, the combination with a latch-bolt having a retracting-arm, of a lever-handle for retracting the bolt from the inside of the door, a roll-back for operation from the outside of the door, a roll-back cam engaging with the retracting-arm of the bolt, and a locking-dog interposed between the said lever and roll-back cam and operated upon by the retracting-arm of the bolt for being thrown into its unlocked position.

In testimony whereof, I have signed this specification in the presence of two subscribing witnesses.

ROBERT OCHSNER.

Witnesses:
   J. HAROLD FLYNN,
   GEORGE D. SEYMOUR.